(12) United States Patent
Seo (10) Patent No.: US 7,608,008 B2
(45) Date of Patent: Oct. 27, 2009

(54) EIGHT-SPEED POWERTRAIN OF AUTOMATIC TRANSMISSION FOR VEHICLE

(75) Inventor: Kang Soo Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 339 days.

(21) Appl. No.: 11/606,574

(22) Filed: Nov. 30, 2006

(65) Prior Publication Data

US 2008/0108472 A1 May 8, 2008

(30) Foreign Application Priority Data

Nov. 6, 2006 (KR) .................. 10-2006-0109091

(51) Int. Cl.
*F16H 3/62* (2006.01)

(52) U.S. Cl. .................. 475/276; 475/277

(58) Field of Classification Search ......... 475/275–277, 475/280, 286, 288, 296
See application file for complete search history.

(56) References Cited

U.S. PATENT DOCUMENTS

2005/0113205 A1* 5/2005 Oguri et al. .................. 475/275

FOREIGN PATENT DOCUMENTS

KR   1020050049374 A   5/2005

* cited by examiner

*Primary Examiner*—Sherry L Estremsky
*Assistant Examiner*—Erin D Bishop
(74) *Attorney, Agent, or Firm*—Morgan, Lewis & Bockius LLP (57) ABSTRACT

A eight-speed powertrain of an automatic transmission for a vehicle combining four simple planetary gear set with a plurality of clutches and brakes to realize seventh forward speed or eighth forward speed and two reverse speeds can improve power delivery performance and reduce fuel consumption.

5 Claims, 5 Drawing Sheets

| | C1 | C2 | C3 | B1 | B2 | B3 | B4 | B5 |
|---|---|---|---|---|---|---|---|---|
| first forward speed | | | ● | ● | ● | | | |
| second forward speed | | | ● | | ● | ● | | |
| third forward speed | ● | | ● | | ● | | | |
| fourth forward speed | ● | ● | | | ● | | | |
| fifth forward speed | ● | ● | ● | | | | | |
| sixth forward speed | ● | ● | | | | | | |
| seventh forward speed | | ● | ● | | | ● | | |
| first reverse speed | | | ● | ● | | | ● | |
| second reverse speed | | | ● | ● | | ● | ● | |

|  | C1 | C2 | C3 | B1 | B2 | B3 | B4 | B5 |
|---|---|---|---|---|---|---|---|---|
| first forward speed |  |  | ● | ● |  |  |  |  |
| second forward speed |  |  | ● |  | ● |  |  |  |
| third forward speed | ● | ● |  |  | ● |  |  |  |
| fourth forward speed | ● | ● |  |  | ● |  |  |  |
| fifth forward speed | ● | ● | ● |  |  |  |  |  |
| sixth forward speed | ● |  | ● | ● |  |  |  |  |
| seventh forward speed | ● |  | ● |  |  | ● |  |  |
| eighth forward speed |  |  | ● |  |  |  |  |  |
| first reverse speed |  |  | ● | ● |  | ● | ● |  |
| second reverse speed |  |  | ● |  |  | ● | ● |  |

EIGHT-SPEED POWERTRAIN OF AUTOMATIC TRANSMISSION FOR VEHICLE

CROSS-REFERENCE TO RELATED APPLICATION

This application claims priority to and the benefit of Korean Patent Application No. 10-2006-0109091 filed in the Korean Intellectual Property Office on Nov. 6, 2006, the entire contents of which are incorporated herein by reference.

BACKGROUND OF THE INVENTION (a) Field of the Invention

The present invention relates to an automatic transmission, and more particularly, to a powertrain of an automatic transmission.

(b) Description of the Related Art

A multi-stage gearshift mechanism of an automatic transmission includes a plurality of planetary gear sets. A powertrain having such a plurality of planetary gear sets varies the torque in multi-stages and outputs it to an output shaft when receiving a converted engine torque from a torque converter. The more speeds the powertrain of an automatic transmission has, the better the power performance and fuel consumption. Therefore, it is desirable for powertrains to have as many speeds as possible. Even for the same number of speeds, durability, power transmission efficiency, and size/weight of a transmission are substantially dependent on how planetary gear sets are arranged. Therefore, research for greater structural strength, less power loss, and more compact packaging is continuously being conducted.

For a manual transmission, too many speeds cause a driver the inconvenience of excessive manual shifting. However, for an automatic transmission, a transmission control unit automatically executes shifting by controlling the operation of the power train, and therefore, more speeds usually implies greater advantages.

Accordingly, research of four-speed and five-speed powertrains has been undertaken, and recently, a powertrain of an automatic transmission enabling six forward speeds and one reverse speed has been developed. On the other hand, a development for the automatic transmission which can realize more speed implies greater advantages.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide an eight-speed powertrain of an automatic transmission having advantages of improving power delivery performance and reducing fuel consumption by combining four planetary gear sets and a plurality of clutches and brakes.

In an exemplary embodiment of the present invention, an eight-speed powertrain of an automatic transmission for a vehicle includes a first shift portion comprising a first and a second planetary gear sets which is a simple planetary gear set, an input path to which power directly is input from an input shaft, and an intermediate output path outputting the power by decelerating and a second shift portion comprising a third and a fourth planetary gear set which is the simple planetary gear set, a first intermediate input path receiving the power through the intermediate output path of the first shift portion, a second intermediate input path which the power is variably input from the input shaft, and a final output path shifting and outputting the power input through the first and the second intermediate input path, wherein a plurality of frictional elements operational elements forming the first and the second shift portion disposed between the operational elements and between the operational elements and a transmission housing such that the operational elements operates selectively as an input element and a fixed element.

The first planetary gear set includes a single pinion planetary gear set including a first sun gear, a first ring gear, and a first planet carrier, the second planetary gear set includes a single pinion planetary gear set including a second sun gear, a second ring gear, and a second planet carrier, the third planetary gear set includes a single pinion planetary gear set including a third sun gear, a third ring gear, and a third planet carrier, and the fourth planetary gear set includes a single pinion planetary gear set including a fourth sun gear, a fourth ring gear, and a fourth planet carrier.

The first shift portion comprises four operational elements by which the first ring gear and the second planet carrier are directly connected and the sun gear of the first planetary gear set and the sun gear of the second planetary gear set are directly connected.

The four operational elements include the first operational element comprising the first sun gear and the second sun gear, the second operational element including the first planet carrier, the third operational element including the first ring gear and the second planet carrier, and the fourth operational element including the second ring gear.

The fourth operational element includes the input path by being fixedly connected to the input shaft, the third operational element includes an intermediate output path, and the first and the second operational elements operates selectively as a fixed element.

The second shift portion comprises four operational elements by which the third ring gear and the fourth planet carrier are directly connected, and the third sun gear and the fourth sun gear are variably connected.

The four operational element, a fifth operational element comprises the fourth ring gear, a sixth operational element comprises the third ring gear and the fourth planet carrier, a seventh operational element comprises the third planet carrier, and a eighth operational element comprises the third sun gear and the fourth sun gear.

The fifth operational element includes the first intermediate input path directly connected to the intermediate output path of the first shift portion, the sixth operational element includes the second intermediate input path variably connected to the input shaft, and the seventh operational element includes the final output path.

The sixth operational element is operated as a fixed element by being variably connected to the transmission housing.

The third sun gear and the fourth sun gear of the eighth operational element, are variably connected each together, and are variably connected to the transmission housing such that all of the third sun gear and the fourth sun gear or one thereof operate as fixed element.

The third sun gear is variably connected to the transmission housing.

The fifth operational element is variably connected to the transmission housing to operate as a fixed element.

In an another embodiment an eight-speed powertrain of an automatic transmission for a vehicle formed by combining a first shift portion comprising a first and a second planetary gear sets which is a simple planetary gear set and a second shift portion a third and a fourth planetary gear sets which is a simple planetary gear set, the powertrain includes wherein the first shift portion includes a first and a second operational elements, a third operational element outputting power to the second shift portion and always operating as an intermediate output path, a fourth operational element receiving from an input shaft and always operating as an input element, and wherein the second shift portion includes a fifth operational element comprises a first intermediate input path directly receiving the power through the intermediate output path and selectively operates as a fixed element, a sixth operational element comprises a second intermediate input path selectively receiving the power from the input shaft and selectively operates as a fixed element, a seventh operational element operates as a output element, and an eighth operational element selectively operates as a fixed element.

The first planetary gear set which is a single pinion planetary gear set including a first sun gear, a first ring gear, and a first planet carrier, the second planetary gear set which is a single pinion planetary gear set including a second sun gear, a second ring gear, and a second planet carrier, the third planetary gear set which is a single pinion planetary gear set including a third sun gear, a third ring gear, and a third planet carrier, and the fourth planetary gear set which is a single pinion planetary gear set including a fourth sun gear, a fourth ring gear, and a fourth planet carrier.

The first, the second, the third, the fourth planetary gear sets are sequentially disposed from an front portion of the transmission.

The first sun gear and the second sun gear are fixedly connected, the first ring gear and the second planet carrier are fixedly connected, the third ring gear and the fourth planet carrier are fixedly connected, and the third sun gear and the fourth sun gear are variably connected.

The first operational element is the first, the second sun gear, the second operational element is the first planet carrier, the third operational element is the first ring gear and the second planet carrier, the fourth operational element is the second ring gear, the fifth operational element is the fourth ring gear, the sixth operational element is the third ring gear and the fourth planet carrier, the seventh operational element is the third planet carrier, and the eighth operational element is the third and the fourth sun gears.

The first and the second operational elements are variably connected to the transmission housing through a brake, the third operational element is fixedly connected to the fifth operational element, the fourth operational element is directly connected to the input shaft, the fifth operational element is variably connected to the transmission housing through the brake, the sixth operational element is variably connected to the input shaft through a clutch and variably connected to the transmission housing through the brake, and the eighth operational element is variably connected to the transmission housing through the brake.

A first clutch variably connecting the input shaft and the sixth operational element is disposed between the first shift portion and the second shift portion, a second clutch variably connecting the first operational element and the second operational element is disposed in front of the transmission, a third clutch variably connecting the eighth operational element and the transmission housing is disposed in the rear portion of the transmission, a first brake variably connecting the second operational element and transmission housing is disposed in front of the transmission, a second brake variably connecting the eighth operational element and the transmission housing is disposed in the rear portion of the transmission, a third brake variably connecting the first operational element and the transmission housing is disposed in front of the transmission, and a fourth brake variably connecting the sixth operational element and the transmission housing is disposed in the rear portion of the transmission.

DETAILED DESCRIPTION OF THE EMBODIMENTS

Exemplary embodiments of the present invention will hereinafter be described in detail with reference to the accompanying drawings.

Figure 1:
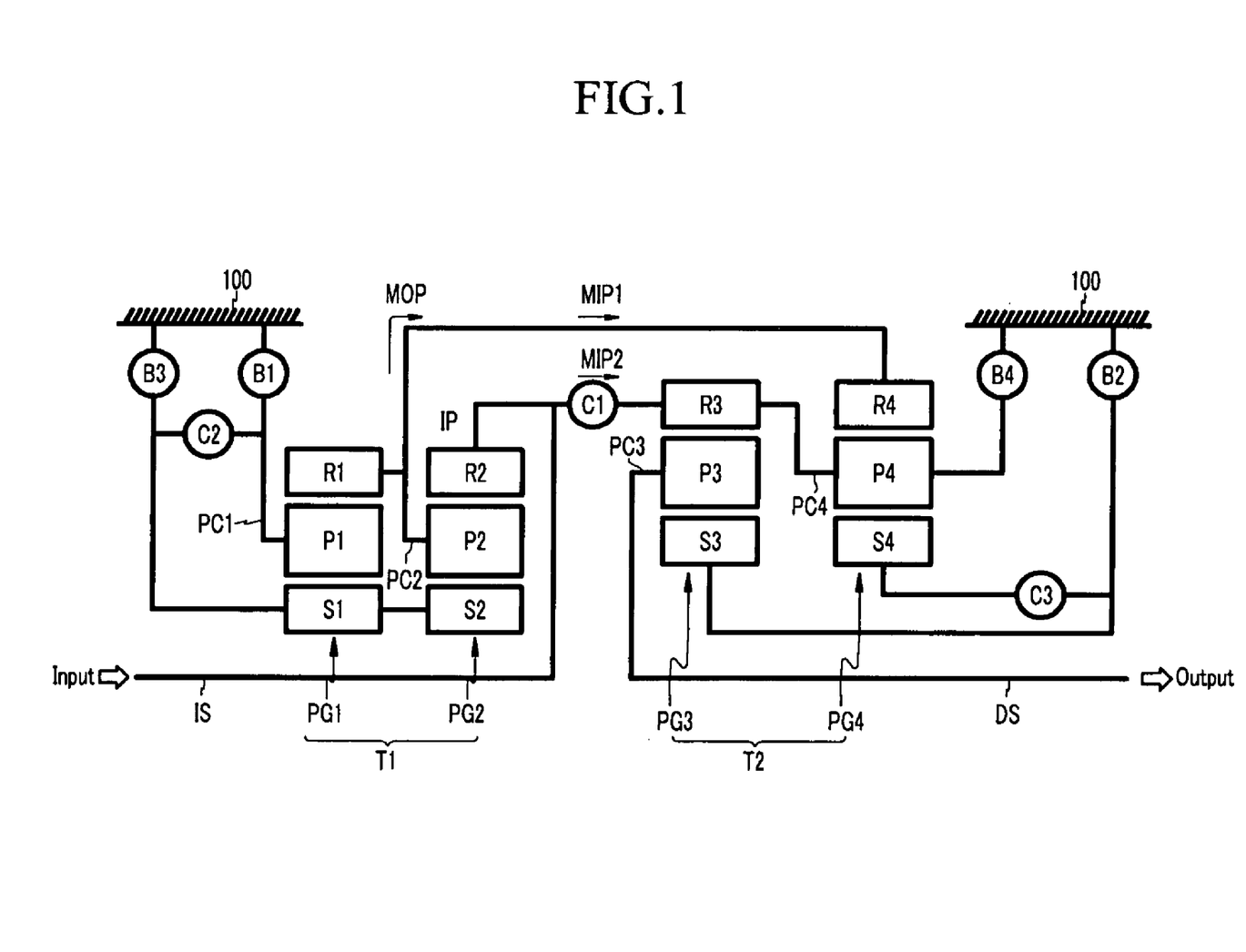
FIG. 1 is a schematic diagram illustrating a powertrain of an automatic transmission for a vehicle according to a first exemplary embodiment of the present invention.

As shown in FIG. 1, an exemplary embodiment of the present invention, a powertrain includes a first shift portion T1 including a first and a second planetary gear sets PG1 and PG2 which is single pinion planetary gear set and a second shift portion T2 including a third and a fourth planetary gear sets PG3 and PG4 which is the single pinion planetary gear set.

A power input from an input shaft IS is output to an output shaft OS through the first and the second shift portions T1 and T2 by shifting.

The input shaft IS is an input member, a turbine shaft of a torque converter. A rotating power from a crankshaft of an engine torque converter is input by shifting and the output shaft OS is an output member and operates left and right wheels through a differential apparatus through an output gear.

The first and the second planetary gear sets PG1 and PG2, forming the first shift portion T1, includes one input path IP that the power is input thereto and one intermediate output path that a decelerated output MOP is output thereto.

The first, the second, the third, and the fourth planetary gear sets PG1, PG2, PG3, and PG4 include a single pinion planetary gear set including sun gears, ring gears, and planet carriers rotatably supporting pinions engaged therebetween which are operated as operating members.

The first planetary gear set PG1 includes a first sun gear S1, a first ring gear R1, and a first planet carrier PC1, the second planetary gear set PG2 includes a second sun gear S2, a second ring gear R2, and a second planet carrier PC2, the third planetary gear set PG3 includes a third sun gear S3, a third ring gear R3, and a third planet carrier PC3, and the fourth planetary gear set PG4 includes a fourth sun gear S4, a fourth ring gear R4, and a fourth planet carrier PC4.

The first, the second, the third, and the fourth planetary gear sets PG1, PG2, PG3, and PG4 are arranged sequentially from an engine side.

The first sun gear S1 is fixedly connected to the second sun gear S2, and the first ring gear R1 is fixedly interconnected to the second planet carrier PC2.

In addition, the third ring gear R3 and the fourth planet carrier PC4 are fixedly interconnected and the third sun gear S3 and the fourth sun gear S4 are variably connected by the third clutch C4.

Therefore, the first shift portion T1 includes four operational elements and the second shift portion T2 includes four operational elements.

That is, the first operational element N1 is formed by the first sun gear and the second sun gear, the second operational element N2 is formed by the first planet carrier PC1, the third operational element N3 is formed by the first ring gear R1 and the second planet carrier PC2, and the fourth operational element N4 is formed by the second ring gear R2.

In addition, the fifth operational element N5 is formed by the fourth ring gear R4, the sixth operational element N6 is formed by the third ring gear R3 and the fourth planet carrier PC4, the seventh operational element N7 is formed by the third planet carrier PC3, and the eighth operational element N8 is formed by the third and the fourth sun gears S3 and S4.

In addition, the power of the engine is input to the second ring gear R2 through an input path IP and a power reduced from the first shift portion T1 is output to the second shift portion T2 through an intermediate output path MOP.

The fourth ring gear R4 is connected to the first intermediate input path MIP1 inputting the power output from the first shift portion T1 and the third ring gear R3 receives the power from the input shaft IS through the first clutch C1.

The first planet carrier PC1 and the first sun gear S1 are variably connected to the transmission housing 100 through the first brake B1 and the third brake B3.

The first planet carrier PC1 and the first sun gear S1 are variably connected by the second clutch C2.

The third planet carrier PC3 acts as an output element by being connected to the output shaft OS and the fourth planet carrier PC4 is variably connected to the transmission housing 100 by the fourth brake B4.

The third sun gear S3 and the fourth sun gear S4 are variably connected to the transmission housing 100 by the second brake B2.

The first brake B1, the third brake B3, and the second clutch C2 are disposed in front of the transmission, the first clutch C1 is disposed between the first shift portion T1 and the second shift portion T2, and the second brake B2, the fourth brake B4, and the third clutch C4 are disposed in a rear portion of the transmission.

Figure 2:
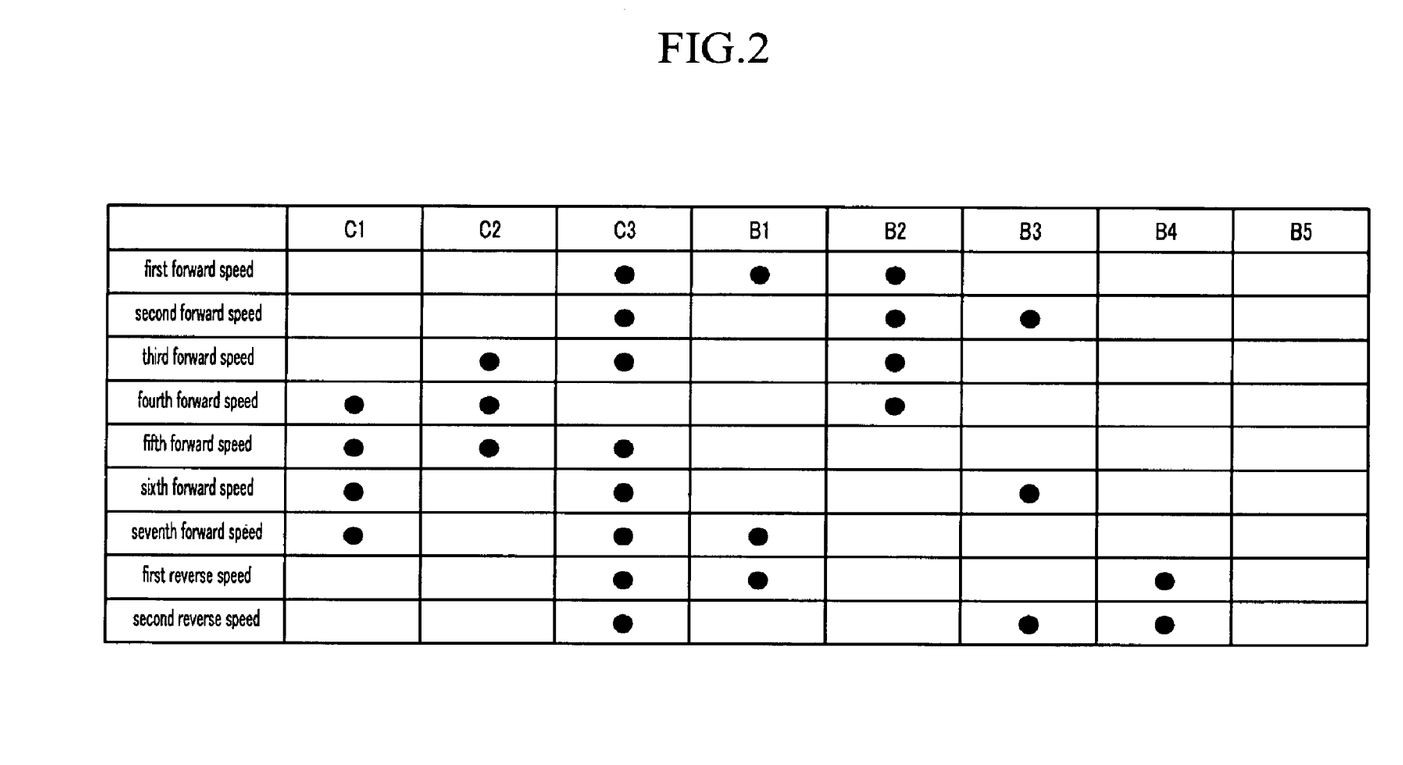
FIG. 2 is an operational chart of a powertrain according to a first exemplary embodiment of the present invention.

Such a powertrain may be operated according to an operational chart as shown in FIG. 2 to realize seven speeds and two reverse speed. That is, the third clutch C4, the first and the second brakes B1 and B2 are operated for the first forward speed, the third clutch C4, the second and the third brakes B2 and B3 are operated for the second forward speed, the second and the third clutches C2 and C3 and the second brake B2 are operated for the third forward speed, the first and the second clutches C1 and C2 and the second brake B2 are operated for the fourth forward speed, the first, and the second, the third clutches C1, C2, and C3 are operated for the fifth forward speed, the first and the third clutches C1 and C3 and the third brake B3 are operated for the sixth forward speed, the first and the third clutches C1 and C3 and the first brake B1 are operated for the seventh forward speed, the third clutch C4 and the first and the fourth brakes B1 and B4 are operated for the first reverse speed, and the third clutch C4 and the third and the fourth brakes B3 and B4 are operated for the second reverse speed.

Figure 3:
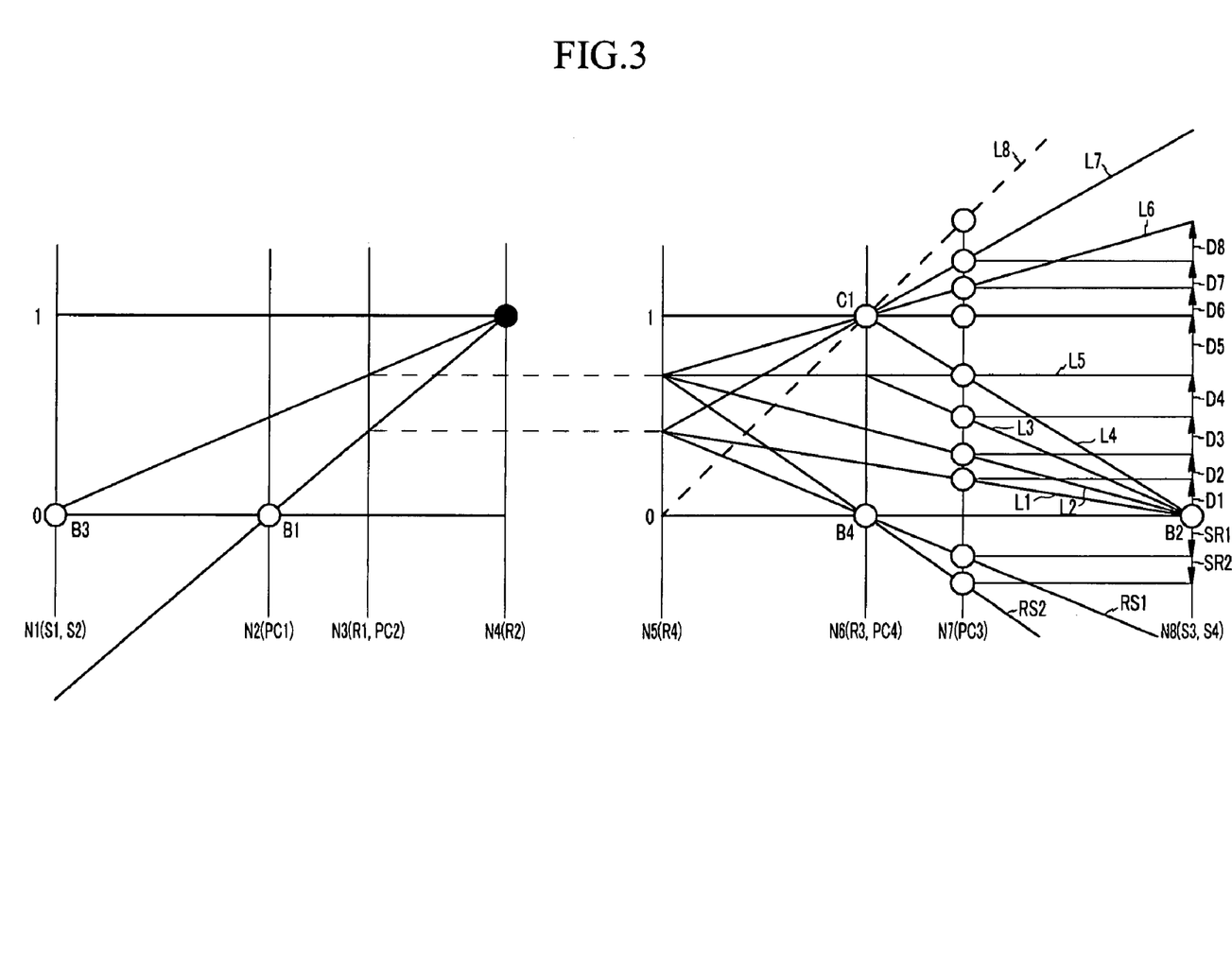
FIG. 3 is a shift diagram of a powertrain according to an exemplary embodiment of the present invention.

As shown in FIG. 3, according to an exemplary embodiment of the present invention, the powertrain includes eight operational elements.

For the first forward speed, the third clutch C4 and the first and the second brakes B1 and B2 are operated.

Then, in the first shift portion T1, the fourth operational element N4 receives an input of an engine speed, the second operational element N2 acts as a fixed element due to the operation of the first brake B1, and reduced speed is output to the third operational element N3.

In addition, in the second shift portion T2, the speed from the third operational element N3 is input to the fifth operational element N5, the eighth operational element N8 acts as the fixed element due to an operation of the third clutch C4 and the second brake B2.

That is, speed line L1 for the first forward speed is formed connecting the fifth operational element N5 with the eighth operational element.

Therefore, the output element of the seventh operational element N7 rotates at a speed D1 and the first forward speed is realized.

For the second forward speed, the first brake B1 is released and the third brake B3 is operated from the first forward speed.

Then, the first operational element N1 acts as the fixed element, the third operational element N3 receives an output, and a speed line of the second forward speed L2 is formed.

Therefore, the output element of the seventh operational element N7 rotates at a speed D2, and the second forward speed is realized.

For the third forward speed, the third brake B3 is released and the second clutch C2 is operated from the second forward speed.

In the second shift portion T2, the power is input to the fifth operational element N5, and the eighth operational element N8 acts as a fixed element due to an operation of the third clutch C4 and the second brake B2.

Therefore, the third forward speed line L3 is formed and the output element of the seventh operational element N7 rotates at a speed D3 and the third forward speed is realized.

For the fourth forward speed, the third clutch C4 is released and the first clutch C1 is operated from the third forward speed.

Therefore, the power is input to the fourth operational element N4 of the first shift portion T1, in the second shift portion T2, the power is input to the sixth operational element N6 due to an operation of the first clutch C1, and the eighth operational element N8 acts as a fixed element due to an operation of the second brake B2.

Therefore, the output element of the seventh operational element N7 rotates at a speed of D4, the fourth speed line L4 is formed, and the fourth forward speed is realized.

For the fifth forward speed, the second brake B2 is released and the third clutch C4 is operated from the fourth forward speed.

Therefore, the fourth operational element N4 of the first shift portion T1 receives the input of the engine and the sixth operational element N6 of the second shift portion T2 receives the input of the engine speed.

The output element of the seventh operational element N7 rotates at a speed of D5, that is, at the same speed of the input engine speed, the fifth forward speed is realized.

For the sixth forward speed, the second clutch C2 is released and the third brake B3 is operated from the fifth forward speed.

Therefore, the first operational element N1 acts as a fixed element, the output speed reduced from the third operational element N3 is input to the fifth operational element N5, and because the sixth operational element N6 receives the input of the engine speed the sixth speed line L6 is formed.

Therefore, the output element of the seventh operational element N7 rotates at a speed of D6 and the sixth forward speed is realized.

For the seventh forward speed, the third brake B3 is released and the first brake B1 is operated from the sixth forward speed.

Then, the second operational element N2 acts as a fixed element, the input speed of the engine is transmitted to the fifth operational element N5 of the second shift portion T2 through the third operational element N3.

In addition, because the sixth operational element N6 receives an input of the engine speed, the seventh speed line L7 is formed and the output element of the seventh operational element N7 rotates at a speed of D7 and the seventh forward speed is realized.

For the first reverse speed, the third clutch C4 and the first and the fourth brakes B1 and B4 are operated.

The fourth operational element N4 receives an input of the engine speed, the second operational element N2 acts as a fixed element, and a reduced engine speed reduced from the engine speed is output to the third operational element N3.

Then, the reduced engine speed is input to the fifth operational element N5, because the sixth operational element N6 acts as a fixed element due to an operation of the fourth brake B4, the first reverse speed line RS1 is formed, the output element of the seventh operational element N7 rotates at a speed of SRI, and the first reverse speed is realized.

For the second reverse speed, the first brake B1 is released and the third brake B3 is operated from the first reverse speed.

The forth operational element N4 receives an input of the engine speed, the first operational element N1 acts as a fixed element due to an operation of the third brake B3, reduced engine speed reduced from the engine speed is output to the third operational element N3.

Then, the reduced engine speed is input to the fifth operational element N5 and because the sixth operational element N6 acts as a fixed element, the second reverse speed line RS2 is formed.

Therefore, the output element of the seventh operational element N7 rotates at a speed of SR2 and the second reverse speeds is realized.

Figure 4:
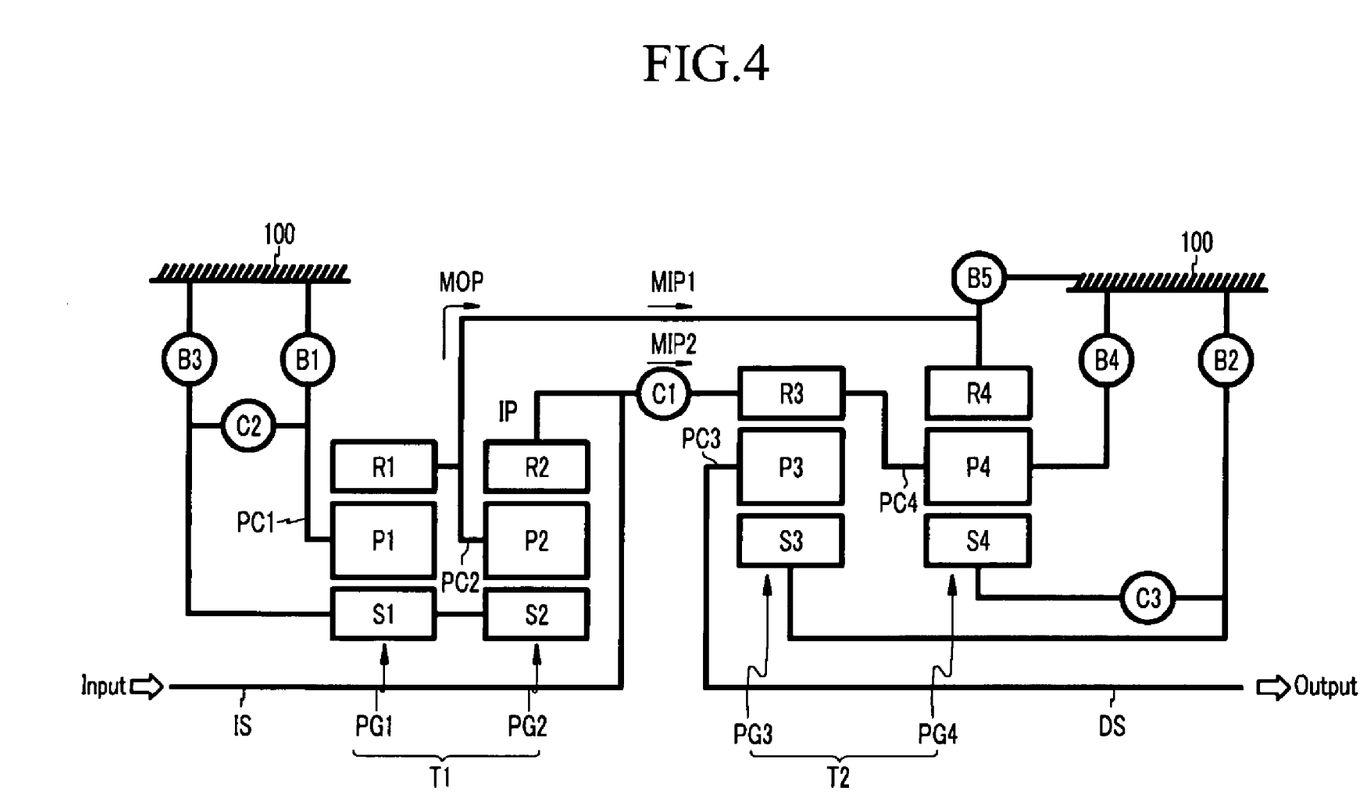
FIG. 4 is a schematic diagram illustrating a powertrain of an automatic transmission according to a second exemplary embodiment of the present invention.

As shown in FIG. 4, a powertrain according to a second exemplary embodiment of the present invention is similar to the powertrain according to the first exemplary embodiment, however a fifth brake B5 is interposed between the fourth ring gear R4 and the transmission housing 100.

Figure 5:
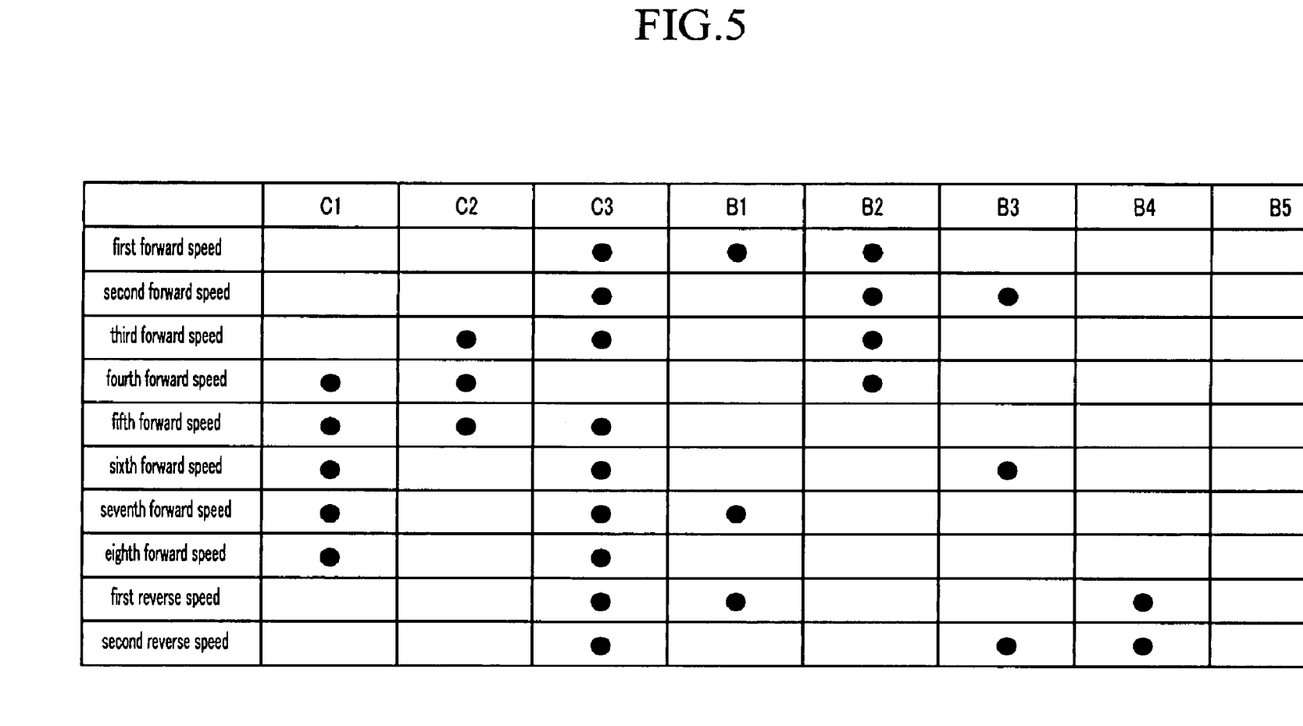
FIG. 5 is an operational chart of a powertrain according to a second exemplary embodiment of the present invention.

Therefore, the shifting process from the seventh forward speed and the second reverse speed is identical to those of the first exemplary embodiment and for the eighth forward speed, as shown in FIG. 5, the first brake B1 is released and the fifth brake B5 is operated from the seventh forward speed.

Therefore, the fourth operational element N4 receives an input of the engine speed, the sixth operational element N6 receives an input of the engine speed reduced from the first shift portion, and the fifth operational element N5 acts as a fixed element due to an operation of the fifth brake B5.

Therefore, the eighth speed line L8 is formed as shown in FIG. 3, the output element of the seventh operational element N7 rotates at a speed of D8, and the eighth forward speed is realized.

According to the present invention, the seventh forward speed and two reverse speeds or the eighth forward speed and two reverse speeds can be realized by combining four simple planetary gear sets, three clutches, and four brakes or five brakes, and therefore, power delivery performance can be improved and fuel consumption can be reduced by effectively utilizing the power of the engine.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An eight-speed powertrain of an automatic transmission for a vehicle comprising:
   a first shift portion comprising first and second planetary gear sets, an input path to which power directly is input from an input shaft, and an intermediate output path outputting the power by decelerating; and
   a second shift portion comprising third and fourth planetary gear set, a first intermediate input path receiving the power through the intermediate output path of the first shift portion, a second intermediate input path which the power is variably input from the input shaft, and a final output path configured to shift and output the power input through the first and the second intermediate input path;
   wherein:
      the first planetary gear set comprises a single pinion planetary gear set comprising a first sun gear, a first ring gear, and a first planet carrier;
      the second planetary gear set comprises a single pinion planetary gear set comprising a second sun gear, a second ring gear, and a second planet carrier;
      the third planetary gear set comprises a single pinion planetary gear set comprising a third sun gear, a third ring gear, and a third planet carrier; and
      the fourth planetary gear set comprises a single pinion planetary gear set comprising a fourth sun gear, a fourth ring gear, and a fourth planet carrier; and
   wherein:
      the third ring gear and the fourth planet carrier are directly connected;
      the third ring gear is selectively connected to the input shaft through a first clutch,
      the first sun gear is selectively connected to the first planetary carrier through a second clutch,
      the fourth sun gear is selectively connected to the third sun gear through a third clutch,
      the first planetary carrier is selectively connected to a transmission housing through a first brake
      the third sun gear is selectively connected to the transmission housing through a second brake,
      the first sun gear is selectively connected to the transmission housing through a third brake, and
      the fourth planetary carrier is selectively connected to the transmission housing through a fourth brake.

2. The powertrain of claim 1, wherein:
   the first ring gear and the second planet carrier are directly connected and
   the sun gear of the first planetary gear set and the sun gear of the second planetary gear set are directly connected.

3. The power train of claim 1, further comprising a fifth brake for selectively connecting the fourth ring gear to the transmission housing.

4. A power train of an automatic transmission, comprising
   a first planetary gear set having operating members of a first sun gear, a first ring gear, and a first planetary carrier;
   a second planetary gear set having operating members of a second sun gear, a second ring gear, and a second planetary carrier;

a third planetary gear set having operating members of a third sun gear, a third ring gear, and a third planetary carrier; and a fourth planetary gear set having operating members of a fourth sun gear, a fourth ring gear, and a fourth planetary carrier, wherein:

the second ring gear is directly connected to an input shaft;

the third planetary carrier is directly connected to an output shaft;

the first ring gear, the second planetary carrier, and the fourth ring gear are directly connected to each other;

the first sun gear and the second sun gear are directly connected to each other, the third ring gear and the fourth planetary carrier are directly connected to each other, the third ring gear is selectively connected to the input shaft through a first clutch, the first sun gear is selectively connected to the first planetary carrier through a second clutch, the fourth sun gear is selectively connected to the third sun gear through a third clutch, the first planetary carrier is selectively connected to a transmission housing through a first brake, the third sun gear is selectively connected to the transmission housing through a second brake, the first sun gear is selectively connected to the transmission housing through a third brake, and the fourth planetary carrier is selectively connected to the transmission housing through a fourth brake.

5. The power train of claim 4, further comprising a fifth brake for selectively connecting the fourth ring gear to the transmission housing.

* * * * *